(12) United States Patent
Grossman et al.

(10) Patent No.: US 9,081,589 B2
(45) Date of Patent: Jul. 14, 2015

(54) PERSISTENT WEB PLUG-INS

(75) Inventors: Gary Grossman, San Francisco, CA (US); Todd Rein, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1596 days.

(21) Appl. No.: 11/566,007

(22) Filed: Dec. 1, 2006

(65) Prior Publication Data

US 2014/0282065 A1    Sep. 18, 2014

(51) Int. Cl.
G06F 15/16 (2006.01)
G06F 13/00 (2006.01)
G06F 9/44 (2006.01)
G06F 9/445 (2006.01)
G06F 17/30 (2006.01)

(52) U.S. Cl.
CPC .......... *G06F 9/4443* (2013.01); *G06F 9/44521* (2013.01); *G06F 9/44526* (2013.01); *G06F 17/30861* (2013.01)

(58) Field of Classification Search
USPC .......... 709/224, 225, 226, 203, 229; 719/331, 719/332
See application file for complete search history.

(56) References Cited

U.S. PATENT DOCUMENTS

| | | | | |
|---|---|---|---|---|
| 6,133,916 A * | 10/2000 | Bukszar et al. | ............... | 715/744 |
| 6,691,176 B1 * | 2/2004 | Narin et al. | .................... | 719/318 |
| 7,441,252 B2 * | 10/2008 | Li et al. | .......................... | 719/331 |
| 7,865,914 B2 * | 1/2011 | Jung et al. | ..................... | 719/331 |
| 2003/0110312 A1 * | 6/2003 | Gunduc et al. | ................ | 709/328 |
| 2003/0145338 A1 * | 7/2003 | Harrington | ................... | 725/136 |
| 2004/0109011 A1 * | 6/2004 | Peterson, Jr. | .................. | 345/700 |
| 2005/0012759 A1 * | 1/2005 | Valmiki et al. | ................ | 345/629 |
| 2007/0067418 A1 * | 3/2007 | Isaacs et al. | .................. | 709/219 |
| 2007/0250634 A1 * | 10/2007 | Knitter et al. | ................. | 709/228 |
| 2007/0260700 A1 * | 11/2007 | Messer | ......................... | 709/217 |
| 2007/0294333 A1 * | 12/2007 | Yang et al. | .................... | 709/203 |
| 2008/0282176 A1 * | 11/2008 | Bates et al. | ................... | 715/760 |

OTHER PUBLICATIONS

Mohammed Kenguka et. al, "Flash support on Embedded Web Browser", Information Techonology Journal 5(6), 2006, pp. 1058-1062.*

Ad4ever—Interactive Technologies—Company Background [online] [Retrieved on: Mar. 20, 2007] Retrieved from: www.ad4ever.com/site/background.html.

* cited by examiner

*Primary Examiner* — Aftab N. Khan

(74) *Attorney, Agent, or Firm* — Kilpatrick Townsend & Stockton LLP

(57) ABSTRACT

Persistent plug-ins are described in a web browser. The browser displays various plug-in instances on a current page, where a plug-in instance is made up of a plug-in player running within the current page and playing content viewable by the user. When a page is changed, a command is issued to close the current page with all of its plug-in instances. If there is a persistence indicator associated with a plug-in instance, the current content state is preserved in memory. If the user desires to return to the original web page or any other page that references the persistent plug-in instance, the plug-in player searches the memory for the current content state and plays the content to return the display of the plug-in instance at the same content state as when the user last left the plug-in instance.

27 Claims, 4 Drawing Sheets

PERSISTENT WEB PLUG-INS

TECHNICAL FIELD

The present invention is related, in general, to web browsers and, more specifically, to persistent web plug-ins.

BACKGROUND

In the modern Internet era, web browsers have become a near universal tool that enable people to navigate the Internet. When a user requests to visit a particular website, the browser transmits a request for a particular hypertext markup language (HTML) document from a web server. The web server downloads the requested HTML document to the browser which interprets the HTML for presentation of the web page to the user.

While HTML is quite capable of formatting data, presenting static images, and providing hyperlinks, it is incapable of presenting complex multimedia-type data. In order to accommodate such complex data, a plug-in system was developed for web browsers that enables a web browser to extend its technical capabilities to present other types of complex data types. A plug-in is additional binary native code that extends the basic functionality of the web browser to render different types of content. It typically resides inside the web browser as a code module. Plug-ins may come installed on the browser or may be installed by a user. As the browser reads the HTML from each downloaded web page, specific tags (e.g., <object>, <embed>, etc.) within the HTML invoke a particular plug-in which will then be loaded into the browser to present the piece of sub-content. The plug-in tags in the HTML document will generally also include a uniform resource locator (URL) that directs the browser to the plug-in content that is to be rendered.

The plug-in often defines an instance of a particular media player or provides a codec for interpreting a specific media type. For example, a plug-in may cause an instance of Adobe Systems Incorporated's FLASH® PLAYER to be loaded in the web browser. In the HTML tags embedding the FLASH® PLAYER, a URL may direct the browser to a SWF (small web file) file, which is the native file type for Adobe Systems Incorporated's FLASH® environment. The embedded FLASH® PLAYER will begin playing the SWF file as it is downloaded to the browser. In most applications, the user sees everything as playing directly in the browser.

One problem with the plug-in architecture is that it is only page persistent, meaning that once the user navigates to another web page, the plug-in is closed and all of the plug-in content goes away. If the user were in the middle of a complex multimedia application and accidentally selects the browser "Back" button, the plug-in would stop and all of the information connected with the multimedia application will be lost. On receiving the request to go "Back," the browser instructs the plug-in code module that it is completed and that the plug-in should unload its content and unload itself as well. When the user returns to that particular web page, the plug-in is reloaded, the content is streamed back to the plug-in, and the application will be re-initialized. The user will then have to restart interaction with the application from the beginning. With the increase in the number of web-based applications that use such plug-in technology, the possibility for a diminished user experience has increased greatly.

In order to address this problem, applications have been developed that periodically save some state of the web application being run on the browser plug-in. In these applications, developers add code to the application that performs the state analysis. The states may be saved in a cookie or in a shared object, which is similar to but more complex and better maintained than a simple cookie. Shared object technology is described in commonly-owned, co-pending U.S. patent application Ser. No. 10/402,352 entitled SHARED PERSISTENT OBJECTS, and commonly-owned, co-pending U.S. patent application Ser. No. 11/263,590, entitled DISTRIBUTED SHARED PERSISTENT OBJECTS, the disclosures of which are incorporated herein. In operation, when the user closes the browser with the plug-in, the data supporting what is being displayed or played in the plug-in is stored in an accessible location. When the user desires to return to the particular web application, the stored data is replayed on the running application which brings the user back to the place where the cookie or shared object was stored. In this type of architecture, both the plug-in instance and the application or content running through the plug-in will still need to be re-initialized before the cookie or shared object is re-loaded therein. This initialization time is computationally time-intensive. Moreover, the state-saving is typically coded into the application, which places the burden of implementation on the application developer. Any existing applications would not be able to operate similarly.

BRIEF SUMMARY

The various representative embodiments of the present invention relate to systems, methods, and computer programs products for implementing persistent plug-ins. A web browser displays various plug-in instances on a current page. A plug-in instance is made up of a plug-in player running within the current page and playing content viewable by the user. When the user desires to view a different page, a command is issued by the browser to close the current page and all plug-in instances. If the plug-in player reads a persistence indicator associated with particular plug-in data, the current content state of the plug-in instance is preserved in memory. As a part of viewing the different page, all of the plug-in instances, including the persistent plug-ins are removed from the browser display. If the user desires to return to the original web page or any other page that references the persistent plug-in instance, the plug-in player searches the memory for the current content state to return the display of the plug-in instance at the same state as when the user last left the plug-in instance.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION

Figure 1:
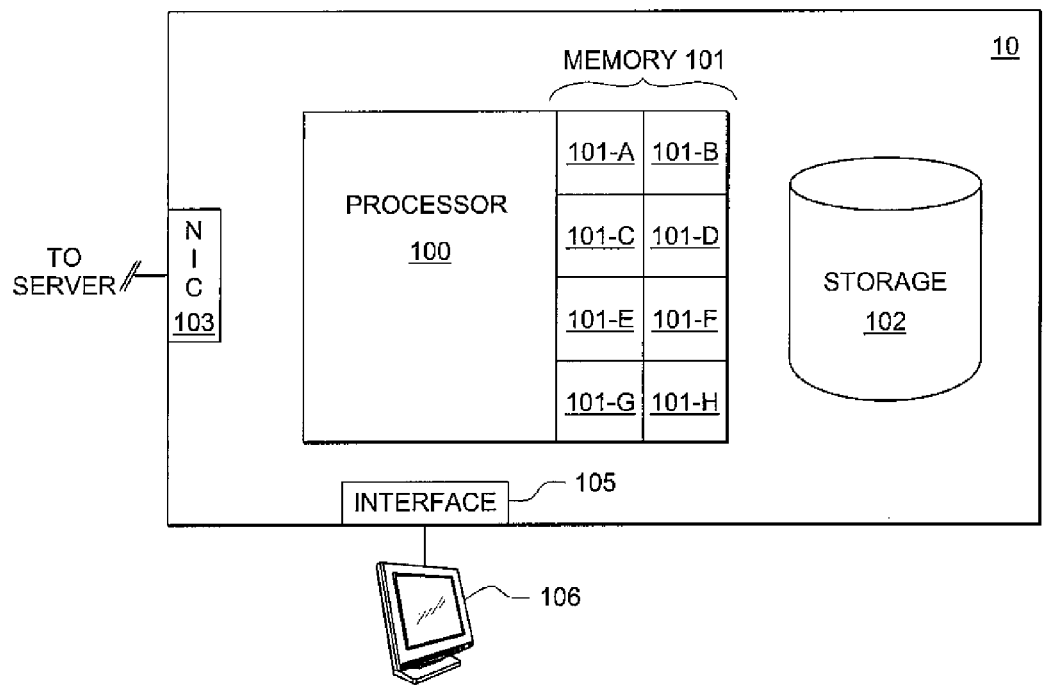
FIG. 1 is a block diagram illustrating a computer operating a web plug-in system configured according to one embodiment of the present invention.

FIG. 1 is a block diagram illustrating computer 10 operating a web plug-in system configured according to one embodiment of the present invention. Computer 10 includes processor 100 with memory 101 divided into memory blocks 101-A-101-H, storage 102, network interface card (NIC) 103, which facilitates computer 10's connection to Internet 104, and display interface 105, which facilitates computer 10's connection to display 106. When operating a web browser on display 106, the code underlying the browser is loaded from storage 102 into memory 101, into memory block 101-A, for example. Processor 100 processes the code and interacts with NIC 103 to maintain communication with web servers over Internet 104 and display interface 105 to render the visual information from the web browser onto display 106.

When a particular web page calls for the use of a plug-in, a plug-in code module is loaded into memory 101, memory block 101-F, for example, from storage 102. Processor 100 processes the plug-in code module and displays an instance of the player supported by the plug-in on display 106. The content for display in the player instance is downloaded from Internet 104 and stored in memory 101, memory block 101-G, for example, and is then used by the plug-in being processed by processor 100 and displayed on display 106. In the embodiment described with respect to FIG. 1, the plug-in is designated as persistent. Therefore, when the user navigates to another web page, instead of unloading the plug-in from memory block 101-F, it terminates all operations of the plug-in but remains in memory block 101-F. In the termination sequence, all pending actions running in the plug-in are canceled, it no longer receives any central processing unit (CPU) cycles from processor 100, and disables all input/output (I/O) interfaces with the user.

If the user navigates back to the original web page, the HTML supporting the web page indicates that the plug-in is a persistent plug-in. With this indication, the plug-in player searches for the player content stored in storage 102. Because the plug-in instance in memory block 101-F has been frozen and not completely shut down and unloaded, it does not have to be re-initialized and does not have to download the content stream from Internet 104. The player content is reloaded into memory 101, memory block 101-C, for example. The plug-in instance loads the player content from memory block 101-C, which provides the state of the content when the plug-in/player instance was stopped. Thus, without the need to re-initialize the plug-in and player instance, and without the need to stream the content again from the Internet, the user experiences a seemingly instantaneous "on" with the application running in the player instance when the user returns to that particular web page.

Figure 2A:
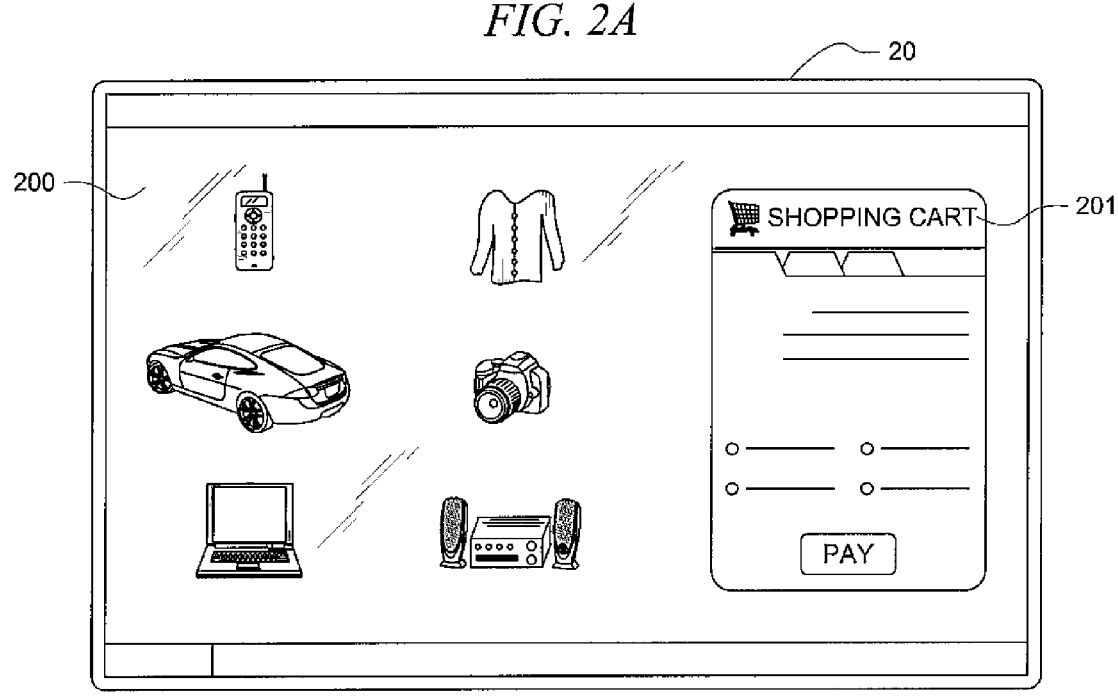
FIG. 2A is a screenshot illustrating a shopping cart, which is a persistent web object configured according to one embodiment of the present invention.

FIG. 2A is a screenshot illustrating shopping cart 201, which is a persistent web object configured according to one embodiment of the present invention. Web page 200, presented on browser 20, is a shopping application having product presentation provided in HTML and shopping cart 201 presented in a persistent plug-in implemented by a plug-in player, such as an instance of a FLASH® PLAYER. As the user first navigates to web page 200, browser 20 interprets the HTML tags that define the persistent plug-in as a FLASH® PLAYER. Browser 20 then loads the FLASH® PLAYER plug-in which accesses the URL identified in the HTML defining web page 200 to download the plug-in content SWF file. The SWF file running within the plug-in instance of the FLASH® PLAYER executes the application for shopping cart 201. The user may interact with shopping cart 201 to enter various information and select various products for purchase from within web page 200. As the user performs these interactions, the data and responsive processing of shopping cart 201 locally stores the state of the content that is being executed for shopping cart 201.

Figure 2B:
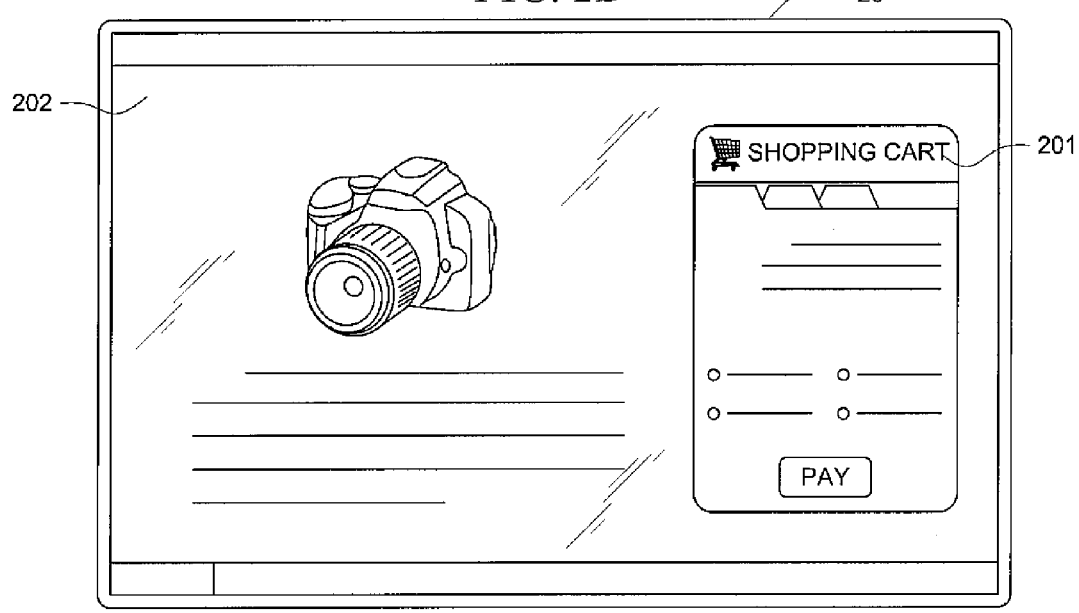
FIG. 2B is a screenshot illustrating the shopping cart, configured according to one embodiment of the present invention, displayed in association with a web page.

FIG. 2B is a screenshot illustrating shopping cart 201, configured according to one embodiment of the present invention, displayed in association with web page 202. In viewing web page 200 (FIG. 2A), the user desired to view the detail of a particular camera. After selecting the hyperlinked picture of the desired camera, web browser 20 transmitted a request to a web server (not shown) for the HTML file defining web page 202. On this request, web browser 20 closed the current page, web page 200 (FIG. 2A) and de-allocated the memory for its HTML file and all of its related plug-ins. When web browser 20 instructs shopping cart 201 to unload, all pending actions that have been requested or begun by shopping cart 201 are stopped. The plug-in player then stores the current state information into a data file, either in memory or on some other storage device, and then suspends its operation. This suspension isolates the application underlying shopping cart 201 such that it does not receive any CPU cycles and has no connection or operation with I/O interfaces.

Web browser 20 receives the HTML document underlying web page 202 and begins interpreting the HTML tags. Web browser 20 recognizes a reference to a FLASH® PLAYER plug-in instance within the HTML. This particular plug-in instance reference indicates that persistent plug-in data may exist. Therefore, instead of generating a new instance of a FLASH® PLAYER and re-starting the application supporting shopping cart 201, the plug-in player searches memory for either the suspended shopping cart 201, the data file that contains all of the appropriate state information for shopping cart 201, or both including any information that the user may have entered while interacting with web page 200 (FIG. 2A).

The data file is loaded into the existing instance of shopping cart 201 and then shopping cart 201 is displayed to the user viewing web page 202.

To the user viewing the transition between web page 200 (FIG. 2A) and web page 202, shopping cart 201 appears to remain active and unchanged during the entire transition. Shopping cart 201 appears to remain on top of the web page view while the page is refreshed to web page 202. However, in actual operation, shopping cart 201 is suspended completely when web page 202 is requested, and then reactivates when the plug-in player reads the specific HTML tags defining the persistent plug-in for shopping cart 201. Moreover, the reactivation occurs without the need to reinitialize the shopping cart application or without the need to download any data from the remote server or any cache. Thus, the reactivation appears seamless to the user.

The suspended state of the persistent plug-in creates an environment where the plug-in is still loaded on the local system, but that all of its operations and network connections are ceased or closed. There are many different methods that may be used to achieve or implement such a suspended state. For example, the plug-in code may "trick" the web browser into both believing that the instance has been closed and unloaded when a refresh occurs and maintaining the plug-in loaded in memory. In another method, the entire state of the plug-in instance may be serialized and stored locally either in some kind of shared memory or in a local storage. The various embodiments of the present invention are not limited to any one method for creating a suspended state for such persistent plug-ins.

Figure 3A:
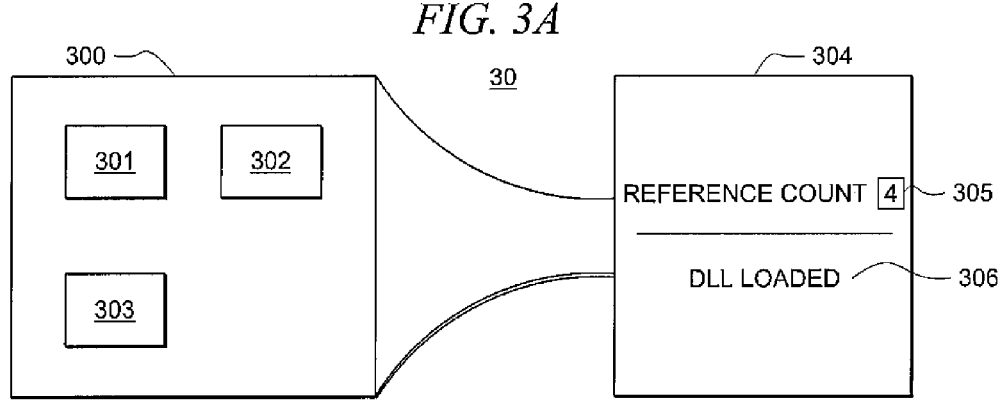
FIG. 3A is a block diagram illustrating a browser that operates a persistent plug-in configured according to one embodiment of the present invention.

FIG. 3A is a block diagram illustrating browser 30 that operates persistent plug-in 302 configured according to one embodiment of the present invention. Computer 304 processes and presents web page 300 which includes plug-in instances 301-303. Each of plug-in instance 301-303 is an instance of a media player. The application code for a plug-in is not a regular application that can be executed by a user like any other application. Rather, it is a library of code that gets linked into an already-running application (e.g., dynamic link library (DLL) for Microsoft Corporation's WINDOWS® operating system). When browser 30 determines which plug-ins it will need for displaying web page 300, it loads the appropriate link library to implement the plug-in. In the case where multiple instances of the same application are run by browser 30, browser 30 does not load multiple copies of the link library, but instead maintains the single, loaded link library and uses a counter, such as reference count 305, to keep track of how many instances of that plug-in are being used within browser 30.

DLL 306 is loaded into computer 304 when browser 30 determines the plug-in applications needed for plug-in instances 301-303. Reference count 305 is incremented each time one of such plug-in instance 301-303 are rendered in web page 300. However, in the present embodiment, plug-in instance 302 is a persistent plug-in. Therefore, when plug-in instance 302 is rendered in web page 300, reference count 305 is incremented by a count of two. Thus, even though three plug-ins are present in web page 300, reference count 305 has been incremented to a count of four.

In operation, as web browser 30 receives a request for a new web page, it issues an instruction to unload the link library for each of plug-in instance 301-303. Each time the unload instruction is issued, reference count 305 is decremented, such that DLL 306 is not unloaded until reference count 305 is decremented to zero. Because only three plug-in instances are present in web page 300, web page 300 only issues three unload instructions, which leaves one remaining.

Since reference count 305 does not reach zero, DLL 306, which defines plug-in instance 302, remains in memory. If the user were to return to web page 300, because DLL 306 remains in memory, and the code for web page 300 identifies plug-in instance 302 as a persistent plug-in, plug-in instance 302 would re-render at the exact point at which the user left web page 300. However, the other plug-ins 301 and 303, which are not persistent, would each re-initialize at the beginning of their respective applications.

Figure 3B:
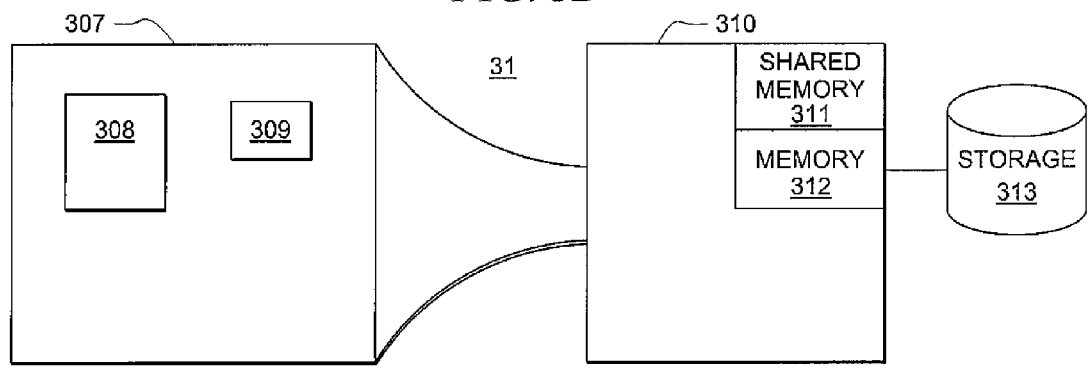
FIG. 3B is a block diagram illustrating a browser displaying a plug-in instance configured according to one embodiment of the present invention.

FIG. 3B is a block diagram illustrating browser 31 displaying plug-in instance 308 configured according to one embodiment of the present invention. As a user requests access to web page 307, browser 31 issues a request for the underlying HTML document from the corresponding web server (not shown). The HTML document is then downloaded to computer 310 where browser 31 interprets and renders web page 307. Web page 307 includes references to two plug-in instances, plug-in instances 308 and 309. The reference to plug-in instance 308 identifies a persistent plug-in. When reading this persistence reference to plug-in instance 308, the plug-in player checks shared memory 311 for any data stored defining plug-in instance 308.

In the presently illustrated embodiment, on the first access to web page 307, there are no data files in shared memory 311. Without existing data files in shared memory 311, the plug-in player initializes the application supporting plug-in instance 308 as it does with plug-in instance 309. All of the information and data supporting plug-in instances 308 and 309 is saved in memory 312 during operation of web page 307. The user then desires to jump to another web page. When the user enters the request, web browser 31 signals plug-in instance 309 to unload its library and close the player instance of the plug-in. When the plug-in player for the persistent plug-in instance receives the signal, it serializes the exact state of plug-in 308 and saves the data in shared memory 311. The player instance supporting plug-in instance 308 serializes every aspect of the player state and stores in shared memory 311. After this serialization has occurred, plug-in instance 308 is halted along with any pending actions that it has directed.

When the application presented by plug-in instance 308 is programmed, the developer includes a dormancy limit that defines how long plug-in instance 308 and the serialized supporting state data remain in memory 312 and shared memory 311, respectively. In order to keep memory space available, the various embodiments of the present invention may have a default dormancy limit that specifies when the plug-in player can delete the persistent plug-in data. However, in the embodiment illustrated in FIG. 3B, a configurable dormancy limit is available for the plug-in application developer. Thus, if the particular plug-in application would not require as much time as provided in the default dormancy limit, the application developer may set a different time.

If the user of browser 31 desires to return to web page 307, or any other web page that references the persistent instance of plug-in instance 308, on reading the persistency notification relating to plug-in instance 308 in the HTML document, the plug-in player searches memory 31 for the serialized plug-in data. In the illustrated embodiment, the user has returned to web page 307 within the designated dormancy limit. Therefore, the resident data supporting plug-in instance 308 remains in memory 312. Upon locating the serialized data, it is transferred to the player instance which then de-serializes the data to re-create the exact state of plug-in instance 308 as existed with the user left web page 307. Web page 307 is then presented to the user having a newly re-initialized plug-in instance 309, which is in the exact state that it was when the user left web page 307 before.

It should be noted that in additional and/or alternative embodiments of the present invention, the player instance may remain in memory 312, but in an inactive state. Still alternative embodiments may store the player instance or supporting data in storage 313. In such embodiments, the internal memory of memory 312 is then freed up for new web pages and Internet applications. Moreover, when browser 31 is asked to return to web page 307 or another web page that references the persistent instance of plug-in instance 308, the plug-in player will search storage 313 for the initialized player instance.

Figure 3C:
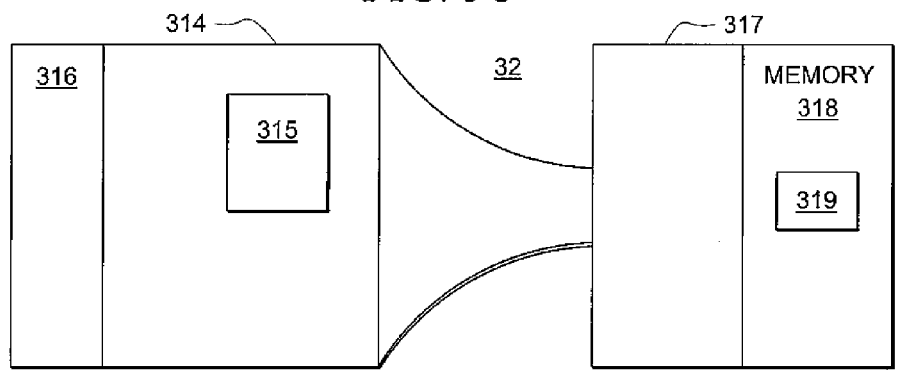
FIG. 3C is a block diagram illustrating a browser configured according to one embodiment of the present invention.

FIG. 3C is a block diagram illustrating browser 32 configured according to one embodiment of the present invention. Browser 32 renders web page 314 including plug-in instances 315 and 316. Plug-in instance 316 is configured as a persistent plug-in. It is implemented using a plug-in player, such as a media player, plug-in application, or the like, that is capable of independently choosing to remain resident in memory 318 despite browser 32 directing all plug-ins to be stopped and unloaded. One example of such a tool for implementing plug-in 316 is Microsoft Corporation's ACTIVEX® system and protocol for distributed objects. ACTIVEX® is often used for embedding multimedia files in web pages.

The plug-in player instance is resident in location 319 of memory 318 on computer 317. When a user selects to leave web page 314, browser 32 will ask permission of the plug-in player instance control at location 319 to determine whether or not browser 32 may close it. Because plug-in 316 has been programmed as a persistent plug-in according to one embodiment of the present invention, the plug-in player instance control responds that it will not close. Thus, while browser 32 will receive the newly requested web page and present that to the user, plug-in instance 316 will remain active in memory 318 at location 319. However, because the new web page does not contain a reference to plug-in instance 316, it does not show on the new, rendered web page. Should the user desire to later return to web page 314 or another web page that references to plug-in instance 316, browser 32 only needs to render plug-in instance 316 from its location 319 in memory 318. Because it never closed, plug-in instance 316 would be rendered exactly as it was left when the user moved from web page 314.

Figure 4:
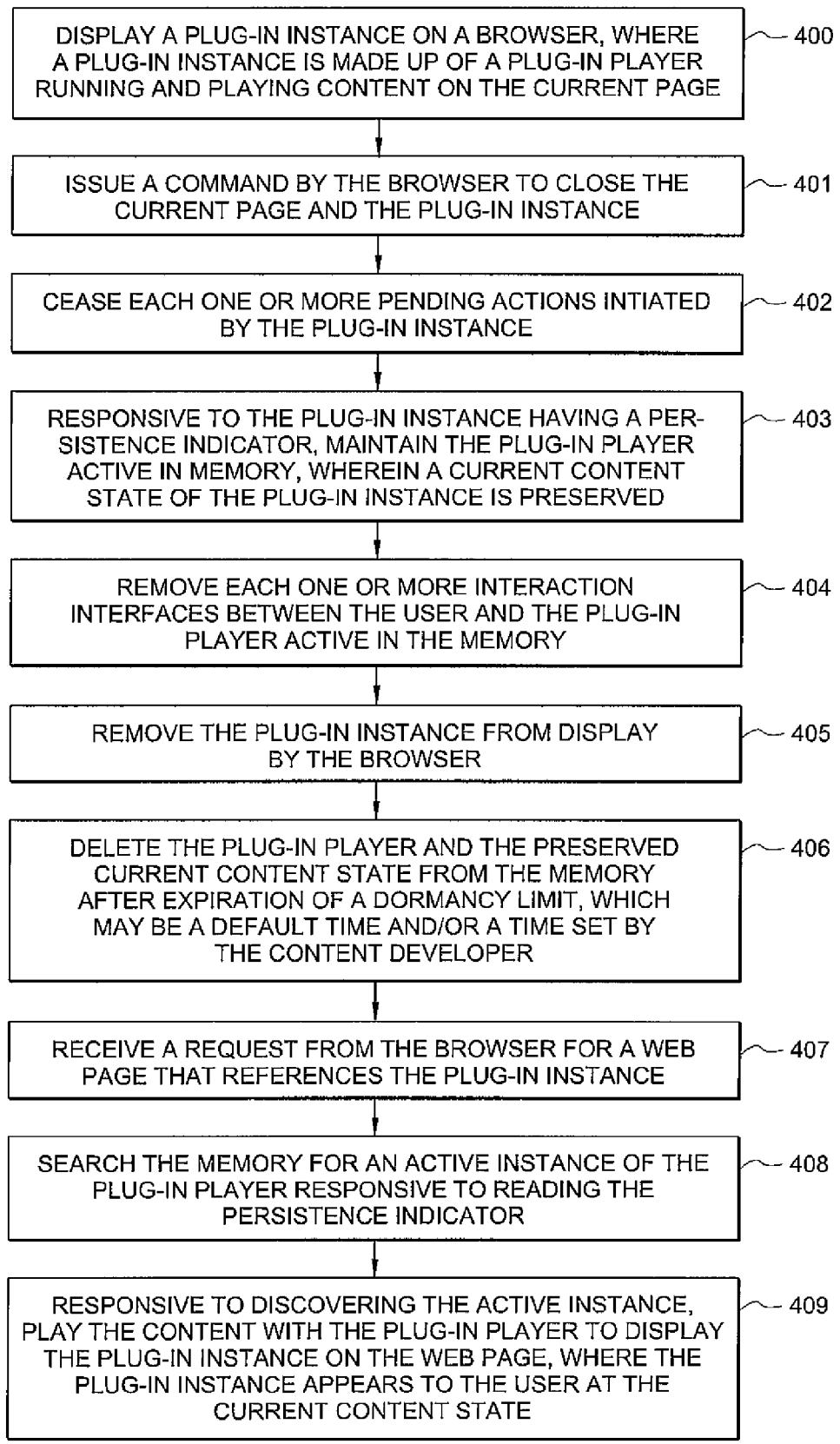
FIG. 4 is a flowchart illustrating example steps executed to implement one embodiment of the present invention.

FIG. 4 is a flowchart illustrating example steps executed to implement one embodiment of the present invention. In step 400, a plug-in instance is displayed on a browser, where a plug-in instance is made up of a plug-in player running and playing content on the current page. A command is issued by the browser, in step 401, to close the current page and the plug-in instance. Each one or more pending actions initiated by the plug-in instance is ceased in step 402. Responsive to the plug-in instance having a persistence indicator, a current content state of the plug-in instance is maintain in memory, in step 403. In step 404, remove each one or more interaction interfaces between the user and the plug-in instance, whose current content state is store in the memory. The plug-in instance is removed, in step 405, from display by the browser. The plug-in player and the preserved current content state are deleted from the memory, in step 406, after expiration of a dormancy limit, which may be a default time and/or a time set by the content developer. In step 407, a request is received from the browser for a web page that references the plug-in instance. The memory is then searched, in step 408, for an active instance of the plug-in player responsive to reading the persistence indicator. Responsive to discovering the active instance, the content is played with the plug-in player, in step 409, to display the plug-in instance on the web page, where the plug-in instance appears to the user at the current content state.

The program or code segments making up the various embodiments of the present invention may be stored in a computer readable medium or transmitted by a computer data signal embodied in a carrier wave, or a signal modulated by a carrier, over a transmission medium. The "computer readable medium" may include any medium that can store information. Examples of non-transitory computer readable medium include an electronic circuit, a semiconductor, a semiconductor memory device, a ROM, a flash memory, an erasable ROM (EROM), a floppy diskette, a compact disk CD-ROM, an optical disk, a hard disk, and the like. The computer data signal may include any signal that can propagate over a transmission medium such as electronic network channels, optical fibers, air, electromagnetic, RF links, and the like. The code segment may be downloaded via computer networks such as the Internet, Intranet, and the like.

Figure 5:
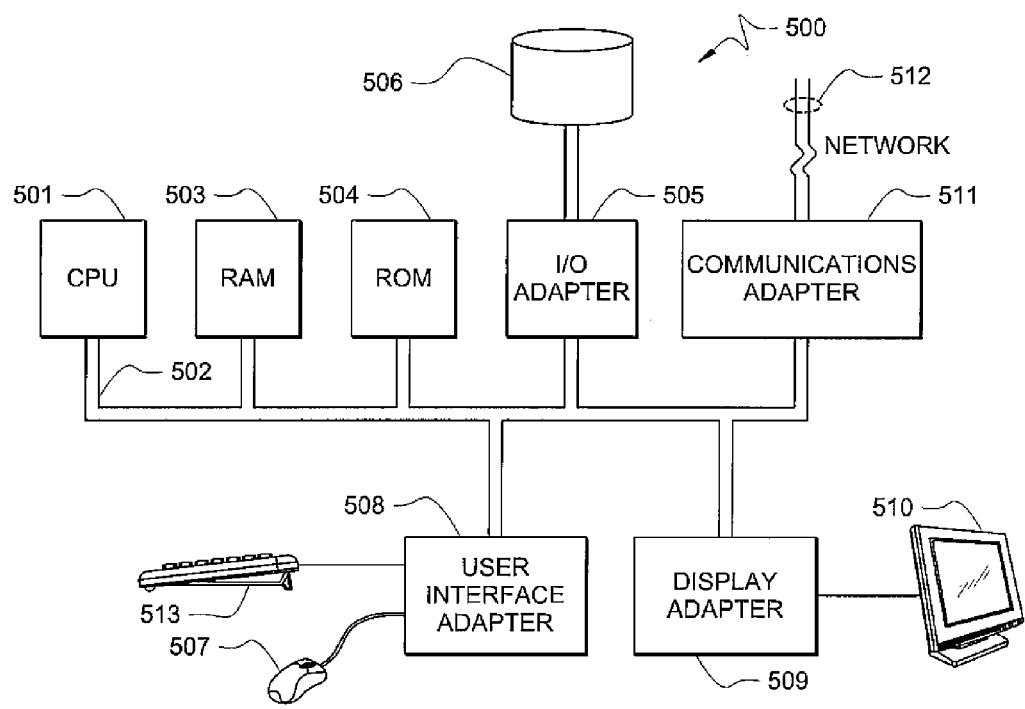
FIG. 5 illustrates a computer system adapted to use embodiments of the present invention.

FIG. 5 illustrates computer system 500 adapted to use embodiments of the present invention, e.g. storing and/or executing software associated with the embodiments. Central processing unit (CPU) 501 is coupled to system bus 502. The CPU 501 may be any general purpose CPU. However, embodiments of the present invention are not restricted by the architecture of CPU 501 as long as CPU 501 supports the inventive operations as described herein. Bus 502 is coupled to random access memory (RAM) 503, which may be SRAM, DRAM, or SDRAM. ROM 504 is also coupled to bus 502, which may be PROM, EPROM, or EEPROM. RAM 503 and ROM 504 hold user and system data and programs as is well known in the art.

Bus 502 is also coupled to input/output (I/O) controller card 505, communications adapter card 511, user interface card 508, and display card 509. The I/O adapter card 505 connects storage devices 506, such as one or more of a hard drive, a CD drive, a floppy disk drive, a tape drive, to computer system 500. The I/O adapter 505 is also connected to a printer (not shown), which would allow the system to print paper copies of information such as documents, photographs, articles, and the like. Note that the printer may be a printer (e.g., dot matrix, laser, and the like), a fax machine, scanner, or a copier machine. Communications card 511 is adapted to couple the computer system 500 to a network 512, which may be one or more of a telephone network, a local (LAN) and/or a wide-area (WAN) network, an Ethernet network, and/or the Internet network. User interface card 508 couples user input devices, such as keyboard 513, pointing device 507, and the like, to the computer system 500. The display card 509 is driven by CPU 501 to control the display on display device 510.

Although the present invention and its advantages have been described in detail, it should be understood that various chan o after loose out on ges, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
displaying a plug-in instance on a current page in a browser, wherein said plug-in instance comprises:
running a plug-in player within said current page;
increasing a reference count by two for a linked code library supporting the plug-in player responsive to displaying the plug-in instance; and
playing content on said running plug-in player;
issuing a command by said browser to close said current page and said plug-in instance;
decreasing the reference count by one responsive to issuing the command to close the current page and the plug-in instance;
responsive to said plug-in instance having a persistence indicator, maintaining a current content state of said plug-in instance in memory, wherein said maintaining comprises:
retaining the linked code library in the memory when the reference count is greater than zero;
preserving an active state of said plug-in player in the memory; and
storing data representing said current content state in the memory; and
removing said plug-in instance from display by said browser.

2. The method of claim 1 further comprising:
ceasing each one or more pending actions initiated by said plug-in instance, responsive to said issuing said command; and
removing each one or more interaction interfaces between said user and said plug-in player active in said memory.

3. The method of claim 1 further comprising:
receiving a request from said browser for a web page, wherein said web page references said plug-in instance;
searching said memory for said current content state responsive to reading said persistence indicator; and
responsive to discovering said current content state, playing said content with said plug-in player to display said plug-in instance on said web page, wherein said plug-in instance appears at said current content state.

4. The method of claim 1 further comprising:
receiving a request for a web page, wherein said web page references said plug-in instance;
responsive to said plug-in player reading said persistence indicator, accessing said memory to run said data to display said plug-in instance in said current content state.

5. The method of claim 1 wherein maintaining a current content state of said plug-in instance in memory further comprises maintaining the current content state in memory such that, after removing said plug-in instance, during subsequent use of any page that references the plug-in instance, the plug-in player can access the current content state maintained in memory to again display the plug-in instance at the current content state.

6. The method of claim 1 further comprising:
serializing data defining said current content state, responsive to said issuing said command;
wherein said maintaining comprises:
storing said serialized data in said memory;
preserving an active state of said plug-in player in said memory.

7. The method of claim 6 further comprising:
receiving a request for a web page, wherein said web page references said plug-in instance;
responsive to said plug-in player reading said persistence indicator, accessing said memory to run said plug-in player using said serialized data to display said plug-in instance in said current content state.

8. The method of claim 1 further comprising:
deleting said plug-in player and said preserved current content state from said memory, responsive to expiration of a period of time defined by a dormancy limit.

9. The method of claim 8 wherein said dormancy limit is set by a developer of said content.

10. A method comprising:
playing an application in a plug-in player loaded into a browser, wherein said playing application displays a plug-in instance in a web page;
increasing a reference count by two for a linked code library supporting the plug-in player responsive to displaying the plug-in instance;
receiving a request to change said web page;
responsive to said request, broadcasting a signal to unload said plug-in instance;
decreasing the reference count by one responsive to broadcasting the signal to unload said plug-in instance;
responsive to reading a persistence indicator associated with said plug-in instance, preserving a current action state in memory, wherein said preserving comprises:
retaining the linked code library in the memory when the reference count is greater than zero;
preserving an active state of said plug-in player in the memory; and
storing data representing said current content state in the memory;
disconnecting user access to said plug-in instance responsive to said preserving; and
removing said web page from said browser.

11. The method of claim 10 further comprising:
cancelling each one or more pending actions initiated by said plug-in instance responsive to said receiving said request.

12. The method of claim 10 further comprising:
receiving an additional request for an additional web page, wherein said additional web page references said plug-in instance;
searching said memory for said preserved current action state responsive to said plug-in player reading said persistence indicator; and
responsive to discovering said preserved current action state, displaying said plug-in instance on said additional web page, wherein said plug-in instance appears at said current action state.

13. The method of claim 10 further comprising:
deleting said preserved current action state from said memory after a passage of time from said preserving exceeds a dormancy limit.

14. The method of claim 13 wherein said dormancy limit is set by a developer of said application.

15. A computer program product having a non-transitory computer readable medium with computer program logic recorded thereon, said computer program product comprising:
code for displaying a plug-in instance on a current page in a browser, wherein said plug-in instance comprises:
code for running a plug-in player within said current page;

code for increasing a reference count by two for a linked code library supporting the plug-in player responsive to displaying the plug-in instance; and code for playing content on said running plug-in player;

code for issuing a command by said browser to close said current page and said plug-in instance;

code for decreasing the reference count by one responsive to issuing the command to close the current page and the plug-in instance;

code, executable responsive to said plug-in instance having a persistence indicator, for maintaining a current content state in memory, wherein said maintaining comprises:

retaining the linked code library in the memory when the reference count is greater than zero;

preserving an active state of said plug-in player in the memory; and storing data representing said current content state in the memory; and code for removing said plug-in instance from display by said browser.

16. The computer program product of claim 15 further comprising:

code, executable responsive to said issuing said command, for ceasing each one or more pending actions initiated by said plug-in instance; and code for removing each one or more interaction interfaces between said user and said plug-in player active in said memory.

17. The computer program product of claim 15 further comprising:

code for receiving a request for a web page, wherein said web page references said plug-in instance;

code for searching said memory for said current content state responsive to said plug-in player reading said persistence indicator; and code, executable responsive to discovering said current content state, for implementing said plug-in instance on said web page, wherein said plug-in instance appears to said user at said current content state.

18. The computer program product of claim 15, further comprising:

code for receiving a request for a web page, wherein said web page references said plug-in instance;

code, executable responsive to said plug-in player reading said persistence indicator, for accessing said memory to run said plug-in player using said data to display said plug-in instance in said current content state.

19. The computer program product of claim 15 further comprising:

code, executable responsive to said issuing said command, for serializing data defining said current content state;

wherein said code for maintaining comprises:

code for storing said serialized data in said memory;

code for preserving an active state of said plug-in player in said memory.

20. The computer program product of claim 19 further comprising:

code for receiving a request for a web page, wherein said web page references said plug-in instance;

code, executable responsive to said plug-in player reading said persistence indicator, for accessing said memory to run said serialized data to display said plug-in instance in said current content state.

21. The computer program product of claim 15 further comprising:

code, executable responsive to expiration of a period of time determined by a dormancy limit, for deleting said preserved current content state from said memory.

22. The computer program product of claim 21 wherein said dormancy limit is set by a developer of said content.

23. A system comprising:

a processor; and a non-transitory computer-readable medium communicatively coupled to the processor, wherein the processor is configured for executing program code stored in the non-transitory computer-readable medium and thereby performing operations comprising:

playing an application in a plug-in player loaded into a browser, wherein said playing application displays a plug-in instance in a web page;

increasing a reference count by two for a linked code library supporting the plug-in player responsive to displaying the plug-in instance;

receiving a request to change said web page;

responsive to said request, for broadcasting a signal to unload said plug-in instance;

decreasing the reference count by one responsive to broadcasting the signal to unload the plug-in instance;

responsive to reading a persistence indicator associated with said plug-in instance, for preserving a current action state in memory, wherein said preserving comprises:

retaining the linked code library in the memory when the reference count is greater than zero;

preserving an active state of said plug-in player in the memory; and storing data representing said current content state in the memory;

disconnecting user access to said plug-in instance responsive to execution of said means for preserving; and removing said web page from said browser.

24. The system of claim 23, the operations further comprising:

responsive to said means for receiving said request, for cancelling each one or more pending actions initiated by said plug-in instance.

25. The system of claim 23, the operations further comprising:

receiving an additional request for an additional web page, wherein said additional web page references said plug-in instance;

responsive to said plug-in player reading said persistence indicator, for searching said memory for said preserved current action state; and responsive to discovering said preserved plug-in instance, for displaying said plug-in instance on said additional web page, wherein said plug-in instance appears at said current action state.

26. The system of claim 23, the operations further comprising:

deleting said preserved current action state from said memory after a passage of time from said preserving exceeds a dormancy limit.

27. The system of claim 26 wherein said dormancy limit is set by a developer of said application.

* * * * *